United States Patent [19]

Bartholomew

[11] Patent Number: 4,802,697
[45] Date of Patent: Feb. 7, 1989

[54] MEANS OF LOCKING TUBES INTO ENGAGEMENT WITH A PRESSURE FITTING

[75] Inventor: Donald D. Bartholomew, Marine City, Mich.

[73] Assignee: Proprietary Technology, Inc., Southfield, Mich.

[21] Appl. No.: 94,688

[22] Filed: Sep. 9, 1987

[51] Int. Cl.$^4$ .............................................. F16L 39/00
[52] U.S. Cl. ...................... 285/319; 285/921
[58] Field of Search ............... 285/319, 320, 921, 7, 285/233

[56] References Cited

U.S. PATENT DOCUMENTS

| | | | |
|---|---|---|---|
| 3,711,125 | 1/1973 | Dehar | 285/314 X |
| 3,826,523 | 7/1974 | Eschbaugh | 285/314 X |
| 4,610,468 | 9/1986 | Wood | 285/314 X |

Primary Examiner—Dave W. Arola
Attorney, Agent, or Firm—Harness, Dickey & Pierce

[57] ABSTRACT

A releasable clip for purposes of locking a tube into a fitting is shown. The clip is formed as a ring with two or more arms that project from the ring portion. The arms project in a direction that is generally parallel to the tube axis, and are made from plastic or metal material and dimensioned so as to function as springing arms. At the end of the arms is an engaging portion that engages an interior abutting wall of the fitting. The ring portion inside diameter is disposed around the tube and engages an abutting projection (an external bead for example) on the tubing. The clip arms may also include portions at the end of the arms to facilitate installation. One or more pair of arms without the engaging portion may be used to facilitate installation by assisting in maintaining concentricity of the clip to the tube axis. A means for positioning the clip along the tube length is also shown.

5 Claims, 1 Drawing Sheet

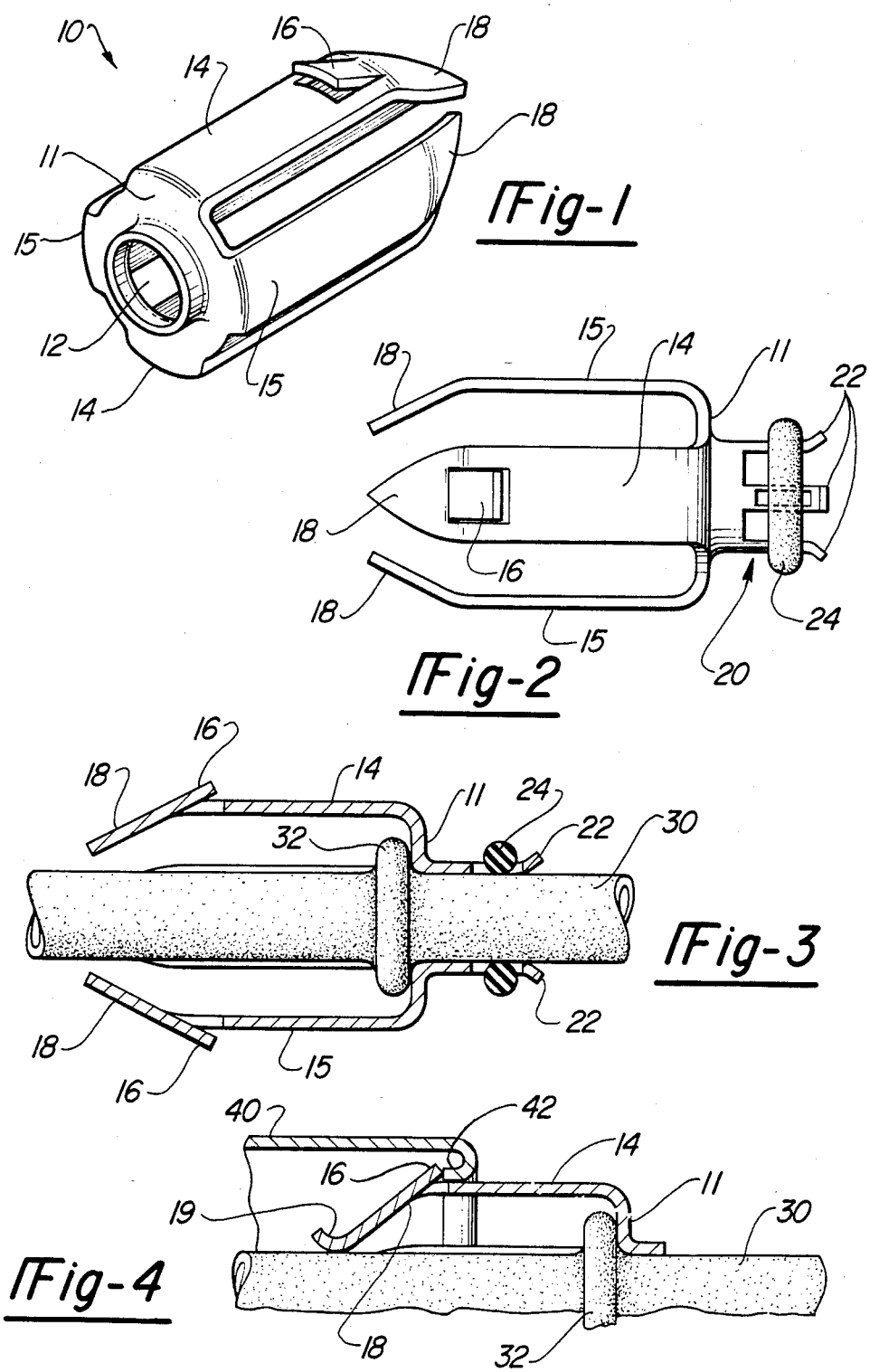

4,802,697

MEANS OF LOCKING TUBES INTO ENGAGEMENT WITH A PRESSURE FITTING

BACKGROUND AND SUMMARY OF THE INVENTION

Occasionally it is desired to employ a device that can hold a tube in engagement with a fitting. The application shown in the figures uses such a device as a redundant method of securing an automotive fuel line into a quick connector that the tube is plugged into. The device is then forced into engagement to an internal flange (abutting wall) that is a portion of the quick connector port. The clip operates between this latching area of the quick connector and a bead formed on the tube. When the clip is pushed into the quick connector it latches and forms a redundant securing means for the tube in the quick connector. The clip may be removed by squeezing the two arms with the latches, thereby disengaging them from the quick connector. The clip may then be moved away from the area by sliding it along the tube so that the quick connector may then be released. In the version that also captures a rubber ring (an O-ring is shown), this combination allows the engagement of the O-ring to the tube to act as a means of preventing the clip from freely sliding up and down the tubing and perhaps not being located in a position on the tube. The pointed inwardly angled tips of the four arms align the clip axially and guide the arms in between the legs of the retainer in the quick connector during assembly of the clip to the quick connector.

It is pointed out that this clip may be applied in any fitting which is provided with a bore and locking groove or abutting wall in the bore that is convenient for installation. Latching in the bore of a fitting is far more fail safe from external activity that might damage or dislodge the clip, and can generally be packaged in less diametric space.

The quick connector shown merely allows the additional aligning features to easily demonstrated.

BRIEF DESCRIPTION OF THE DRAWINGS

FIG. 1 shows a releasable clip in accordance with the present invention.

FIG. 2 shows an elavation view of the releasable clip.

FIG. 3 shows a cross section of the releasable clip mounted on a tube.

FIG. 4 shows a cross section of the releasable clip holding a tube in a fitting.

DETAILED DESCRIPTION OF THE PREFERRED EMBODIMENTS

Referring to the figures, FIG. 1 shows such means, the device or clip 10 with a ring portion 11 having a hole 12 through which the tube to be secured will pass. Extending from ring portion 11 are two pairs of fingers 14 and 15, which are terminated in the manner shown at 18, to provide a guiding lead and facilitate installation. On fingers 14 are disposed locking tabs 16, that will engage a mating abutting portion of a fitting. Fingers 14 and 15 are springlike, and will be slightly compressed inwardly when installed in the fitting.

FIG. 2 shows an elevation view of the device 10 with an added portion 20 consisting of four (4) smaller fingers 22 which support an O-ring 24 concentric with the center axis of device 10.

FIG. 3 shows a cross section view of the device 10 of FIG. 2 mounted on a tube 30 which has an external bead 32 formed on its surface. The front face of ring 11, that faces the bead 32, acts to apply a force on bead 32 if the device 10 is snapped into a fitting, and an attempt is made to withdraw the tube 30 from the fitting.

FIG. 4 shows a portion of a fitting 40 with an abutting wall portion 42, which is engaged by locking means 16 disposed on spring arm 14. Withdrawal of tube 30 is resisted by the clip 10 until arms 14 are inwardly depressed sufficiently to disengage locking means 16 from fitting locking area 42.

The means 20 shown in FIG. 3 act to maintain centerline orientation of the clip 10, as well as the position of clip 10 along tube 30. This will be found to be very convenient during installation.

There are many ways that the device 10 may be shaped, but the combination of at least two springing fingers with locking means that act in tension to prevent tube withdrawal, means of maintaining the concentricity of the locking means within a fitting bore, a fitting bore with cooperating locking means, an external means on the tube to cooperate with the device to prevent withdrawal of the tube from the fitting, and integral means that hold the device to the tube, and optional means of preventing the device from freely sliding along the tube, and optional means 19 of FIG. 4 to enhance the spring force urging locking means 16 into engagement with the fitting after installation, constitute a novel approach to providing a quick connection of a tube to a fitting, or a redundant securement of a tube to a fitting.

Reviewing the patent art in the field of pressure fittings (which will also include what is called vacuum fittings, where the higher pressure is on the outside) one will find one or another of the features of this device on many existing patents, but the useful combination of these essentially mechanical means for this purpose is not found.

What is claimed is:

1. A retainer for retaining a conduit with an annular bead within a receiving fitting, said retainer comprising:
   a ring portion positioned peripherally about the conduit and abutting the annular bead to prohibit withdrawal of the conduit from said retainer;
   at least one arm extending from said ring portion, said at least one arm extending over the conduit annual bead axially along the conduit;
   means for locking said retainer to the receiving fitting, said locking means coupled with said at least one arm such that in use said at least one arm and locking means tensionally maintain the conduit in a locking relationship with the fitting; and
   at least one more additional arm extending from said ring portion over the bead and axially along the conduit for maintaining concentricity of the retainer with respect to the conduit within the fitting.

2. The retainer according to claim 1 further comprising means for facilitating installation of the retainer within the fitting, said facilitating means positioned at the ends of said at least one arm.

3. The retainer according to claim 1 further comprising means for providing additional spring force in said at least one arm for enhancing engagement of said locking means with the fitting.

4. The retainer according to claim 1 further comprising means for decreasing sliding movement of said retainer on the conduit and for maintaining the concentricity of said retainer with respect to the conduit, said means for decreasing sliding movement coupled with said ring portion.

5. The retainer according to claim 4 wherein said means for decreasing sliding movement is comprised of a plurality of fingers extending from said ring portion about the perphery of the conduit, and an O-ring positioned about said finger and adapted to engage the conduit.

* * * * *